July 14, 1970    E. J. E. HEYENS    3,520,370
DEVICE FOR HARVESTING ONE OR MORE ROWS
OF BEETS OR LIKE ROOT CROPS
Filed Nov. 8, 1966

INVENTOR

EUGÉNE J. E. HEYENS

BY

ATTORNEYS

United States Patent Office 3,520,370
Patented July 14, 1970

3,520,370
DEVICE FOR HARVESTING ONE OR MORE ROWS OF BEETS OR LIKE ROOT CROPS
Eugène J. E. Heyens, 176 Zoutestraat, Hulst, Netherlands
Filed Nov. 8, 1966, Ser. No. 592,815
Int. Cl. A01d *15/04*
U.S. Cl. 171—76                                              7 Claims

ABSTRACT OF THE DISCLOSURE

A device for harvesting beets comprising a travelling frame and a holder which is movable relatively to the frame in transverse direction, wherein a harvesting element is suspended from said holder. Owing to this the harvesting element can be adjusted at the places of the beets to be harvested.

---

The invention relates to a device for harvesting one or more rows of beets or like root crops and having a travelling frame, said device being provided for each row with a harvesting element which only comprises a fork-shaped lifter, having its legs directed downwards in such a manner that they penetrate into the ground with their rear-end and the legs of the fork each being connected with an eccentric or a crank of a shaft provided with a drive, said eccentrics or cranks being angularly displaced relatively to each other and the legs of the fork being supported at the frame.

As the rearwards converging legs of the fork perform not only horizontal but also vertical movements they will exert a lifting action on the beet to be harvested.

The invention has for its object to improve said lifting action of the legs of the fork in such a manner that said lifting action gradually increases from the foremost end to the rear-end of the lifter and reaches a maximum value.

According to the invention each leg of the fork freely projects in forwards direction and is rigidly united with a nearly horizontal rod lying at a higher level and both said rods at their foremost and having a pivot on the frame and the eccentric rod or crank being hinged to the substantially horizontal rod in a point lying behind said pivot. With said arrangement the vertical movement of the legs of the fork will be the smallest at their foremost end and be reduced to practically zero by locating the foremost end of the legs of the fork in their centre position each in or nearly in the vertical transverse plane passing through the pivot of the substantially horizontal rod. The legs of the fork not only loosen the beets in the ground for lifting them out of the ground, but the legs are also adapted to deliver the beets to an elevating apparatus.

As the nearly horizontal rods also move in longitudinal direction relatively to each other they may be used for cleaning the beets taken up by the lifter by extending said rods to the rear and by providing at said extension downwards directed bars in such a manner, that corresponding bars of both extensions converge downwards in pairs. The cleaning action of both grids formed by said bars may still be improved by locating the extensions of the nearly horizontal rods carrying said grids for the greater part at a lower level than the pivot of said rods.

The invention will be further described with reference to the accompanying drawing, showing an embodiment of the harvesting unit according to the invention.

Figures 1, 3:
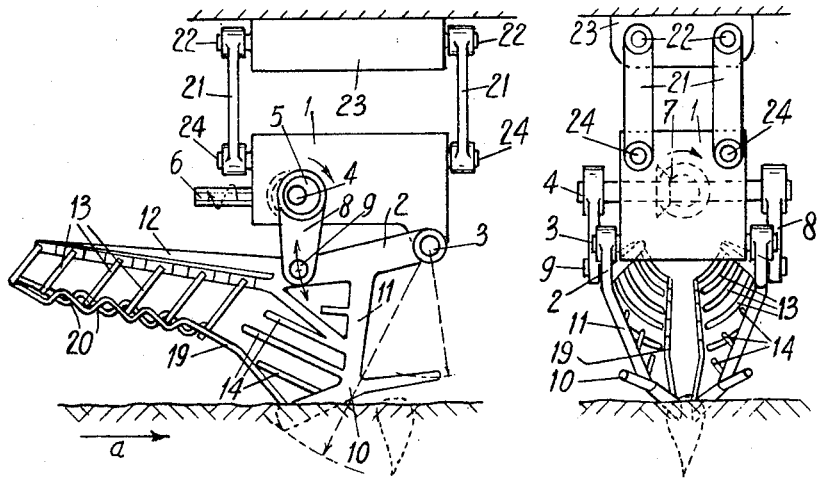
FIGS. 1 and 2 show a lifter according to the invention in side-view and in a view from below respectively.
FIG. 3 is a front-view of the lifter according to FIGS. 1 and 2.
Figure 2:
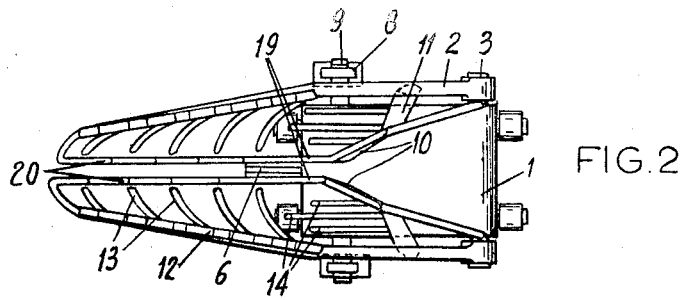

Journals 3 project at the holder 1 and nearly horizontal rods 2 are pivoted on said journals. A shaft 4 is rotatably supported in the holder 1 and carries at each of its outwards projecting ends an eccentric disc 5 secured thereto. The shaft 4 is driven by a shaft 6 provided with a drive through the intermediary of a pair of bevel gear-wheels 7. The rods 8 of the eccentrics 5, which may angularly be displaced by an angle of e.g. 180° relatively to each other are pivoted to a transverse stud 9 of each rod 2. The legs 10 of the fork each are connected to the corresponding rod 2 by an upright rod 11.

The rods 2 each are extended to the rear by a part 12 and said rod parts converge to the rear. A number of bars 13 project downwards at each of the rods 12, said bars forming grids and the corresponding bars of both grids converge downwards as appears from FIG. 3. Guide bars 14 are provided at the upright rods 11 and at the rearmost end of the legs of the fork, said bars 14 being directed rearwards and guide the beet lifted by the legs 10 towards the pair of cleaning grids.

One or more bars 19 are secured to the rear end of each of the legs 10 of the fork, said bars being upwards inclined to the rear and provided with steplike recesses 20. The foremost part of the rods 19 preferably is steeper upwards inclined from the legs 10 of the fork than the rearmost part of the rods containing the steplike recesses 20. On said steep foremost part of the rods 19 the loose earth taken up together with the beets is separated from the beets and falls back on the ground below the rods 19 and the beets move further on the rods 19.

If the device travels on the ground in the direction of the arrow *a* and the legs 10 of the fork are driven by the eccentrics 5, both legs 10 and therefore also both grids 13 and the rods 19 provided with the recesses 20 move relatively to each other. Thereby the beets are lifted very gradually as according to FIG. 1 the foremost end of the legs 10 of the fork is located substantially in the vertical transverse plane through the axis of the pivot 3, so that said end of the legs 10 performs a nearly horizontal movement. The rear end of the legs 10 of the fork has a maximum vertical stroke as the legs 10 as a whole perform a rotation with the journals 3 as centre. The vertical stroke of the rear end of the legs 10 may be varied by displacing the point of connection 9 of the eccentric rods 8 at the rods 2 and when displacing said point 9 in forward direction the vertical stroke of the legs 10 is increased.

In FIG. 1 both eccentrics 5 are shown in their centre position. It is not required that the left and right rod 19 are then the mirror image of each other and as shown in FIG. 1 the recesses 20 of the one rod may be displaced in longitudinal direction with respect to the other rod whereby the lifting action of said rods is still improved.

The holder of the lifter 10 is suspended by means of two pairs of parallel levers 21 from journals 22 at a part 23 of the travelling frame, not shown in the drawing, and provided with ground wheels. The levers 21 are hinged on journals 24 of the holder 1 and said journals constitute a pivot axis extending in longitudinal direction, so that the holders may freely move in transverse direction and the lifter 10 is adapted to obtain its correct position above the beet to be elevated.

What I claim is:

1. In a row harvester for root crops such as beets, in combination:
   a support adapted to be transported over the ground in elevated relation to the surface thereof,
   a pair of open harvesting frames pivotally connected at their forward ends to said support and depending therefrom to straddle the crop row, said frames having ground penetrating leg portions disposed below and behind the pivoted connections of said frames, said legs being mutually convergent to define an entrance mouth for receiving the roots to be harvested, said frames including upwardly inclined portions immediately behind said legs and defining an elevating channel for the harvested roots, means for oscillating said frames in relatively opposite directions about their pivotal connections, said frames including upwardly sloping trailing portions immediately behind said elevating channels, said trailing portions being undulated to feed the harvested roots rearwardly therealong, a main frame, and means freely suspending said support from said main frame for lateral displacements relative thereto.

2. In the harvester according to claim 1 wherein said leg portions are provided with elevated forward extensions having tips lying substantially in a vertical plane containing the pivotal axis of said frames when the frames are at the mid points of their oscillations so that said tips describe essentially horizontal longitudinal movements to aid in guiding the harvester along the crop row.

3. In a row harvester for root crops such as beets, in combination, a support adapted to be transported over the ground in elevated relation to the surface thereof, a pair of open harvesting frames pivotally connected at their forward ends to said support and depending therefrom to straddle the crop row, said frames having ground penetrating leg portions disposed below and behind the pivotal connections of said frames, said legs being mutually convergent to define an entrance mouth for receiving the roots to be harvested, said frames including upwardly inclined portions immediately behind said legs and defining an elevating channel for the harvested roots, means for oscillating said frames in relatively opposite directions about their pivotal connections, a main frame, and means freely suspending said support from said main frame for lateral displacements relative thereto.

4. In the harvester according to claim 3 wherein said leg portions are provided with elevated forward extensions having tips lying substantially in a vertical plane containing the pivotal axis of said frames when the frames are at the mid points of their oscillations so that said tips describe essentially horizontal longitudinal movements to aid in guiding the harvester along the crop row.

5. In a row harvester for root crops such as beets, in combination:

a main frame adapted to be transported over the ground in elevated relation to the surface thereof, a holder connected to said main frame for free movement with respect thereto in transverse direction to the movement of said main frame.

a pair of harvesting members, means pivotally suspending said harvesting members from said support about a transverse axis, said harvesting members having ground penetrating portions converging rearwardly, and means for oscillating said harvesting members in relatively opposite directions about said transverse axis.

6. In the harvester according to claim 5 wherein said ground penetrating portions are located below and behind said transverse axis and are provided with forwardly divergent extensions which project above the ground and describe essentially horizontal longitudinal movements to facilitate guiding of the harvesting members.

7. In the harvester according to claim 5, wherein the holder is suspended from the travelling frame by pairs of parallel links and each pair of said links lying in a common longitudinal plane having a pivot axis at the holder extending in longitudinal direction.

References Cited

UNITED STATES PATENTS

| 50,889 | 11/1865 | Aspinwall | 171—75 |
| 1,060,968 | 5/1913 | Bocker | 171—76 |

ANTONIO F. GUIDA, Primary Examiner

U.S. Cl. X.R.

171—103